US007826657B2

United States Patent
Zhang et al.

(10) Patent No.: US 7,826,657 B2
(45) Date of Patent: Nov. 2, 2010

(54) AUTOMATICALLY GENERATING A CONTENT-BASED QUALITY METRIC FOR DIGITAL IMAGES

(75) Inventors: Ruofei Zhang, San Jose, CA (US); Ramesh R. Sarukkai, Union City, CA (US); Subodh Shakya, San Jose, CA (US)

(73) Assignee: Yahoo! Inc., Sunnyvale, CA (US)

( * ) Notice: Subject to any disclaimer, the term of this patent is extended or adjusted under 35 U.S.C. 154(b) by 995 days.

(21) Appl. No.: 11/637,422

(22) Filed: Dec. 11, 2006

(65) Prior Publication Data

US 2008/0136834 A1   Jun. 12, 2008

(51) Int. Cl.
G06K 9/00 (2006.01)
(52) U.S. Cl. ...................................... 382/162
(58) Field of Classification Search ................. 382/103, 382/162, 224, 236, 305; 345/589
See application file for complete search history.

(56) References Cited

U.S. PATENT DOCUMENTS

| | | | |
|---|---|---|---|
| 6,253,218 B1 | 6/2001 | Aoki et al. | |
| 7,362,922 B2 | 4/2008 | Nishiyama et al. | |
| 2001/0036313 A1 | 11/2001 | Briand et al. | |
| 2003/0234805 A1 | 12/2003 | Toyama et al. | |
| 2004/0008180 A1 | 1/2004 | Appling | |
| 2004/0064455 A1 | 4/2004 | Rosenzweig et al. | |
| 2005/0033758 A1 | 2/2005 | Baxter | |
| 2006/0106764 A1 | 5/2006 | Girgensohn et al. | |
| 2007/0075050 A1 | 4/2007 | Heyl | |
| 2009/0116811 A1* | 5/2009 | Kukreja et al. ................. 386/52 |
| 2009/0228507 A1 | 9/2009 | Jain et al. | |

OTHER PUBLICATIONS

Huang et al., "Image Indexing Using Color Correlorgra," IEEE, Issue date: Jun. 17-19, 1997, pp. 762-768.
Wittenburge et al., "Browsing with Dynamic Key Frame Collages in Web-Based Entertainment Video Services" Date: 1999, 6 pages.
Rautiainen, M. et al., "Cluster-Temporal Browsing of Large News Video Databases" Date: Jun. 2004, 4 pages.

* cited by examiner

*Primary Examiner*—Duy M Dang
(74) *Attorney, Agent, or Firm*—Hickman Palermo Truong & Becker LLP

(57) ABSTRACT

Techniques are described herein for automatically evaluating the quality of digital images based on one or more color characteristics of the images. In some embodiments, a quality metric that indicates the likelihood that the digital images convey semantics is generated based on color characteristics of the digital images. The quality metric may be used, for example, to determine which keyframe to use to make a thumbnail to represent video data. In some embodiments, feature values are generated for an image based on color characteristics of the image, and the feature values are assigned to bins. In such embodiments, the quality metric may be generated to indicate how uniform the distribution of feature values is among the bins.

28 Claims, 2 Drawing Sheets

AUTOMATICALLY GENERATING A CONTENT-BASED QUALITY METRIC FOR DIGITAL IMAGES

FIELD OF THE INVENTION

The present invention relates to digital images and, more specifically, to automatically generating a quality metric for digital images.

BACKGROUND

Images are frequently used to represent electronic items. An image that is used to represent an electronic item is referred to herein as a "representative image". In some cases, representative images are designed by humans. For example, in the context of electronic file systems, manually designed icons are often used to visually represent files and folders.

In other cases, representative images are automatically generated based on information extracted from the electronic items that the images are supposed to represent. Automatically-generated representative images are referred to herein as "thumbnails".

In the context of digital photos, thumbnails are typically lower-resolution images that are automatically generated based on content extracted from higher-resolution images. In the context of digital video, thumbnails are typically digital images extracted from the video content of a digital video file.

Because thumbnails are automatically generated, it is possible for thumbnails to turn out less than ideal. For example, a badly-generated thumbnail of a digital photo may fail to convey the content or beauty of the corresponding photo. Similarly, a badly-generated thumbnail of a video file may fail to clearly and accurately convey the content of the corresponding video file.

Video search engines are examples of systems that represent videos using thumbnails. Video search engines may, for example, be designed to represent each video by a thumbnail that is generated from a frame selected from the video. A video frame upon which a thumbnail is based is referred to herein as a keyframe.

In some cases, due to mistake made by the extraction algorithm and/or network traffic situation, the keyframes that are selected by video search engines to create thumbnails are not informative for users to understand what the corresponding video is about. Although video search engines have accompanying metadata for each video, bad thumbnails tend to hurt user experience significantly. Any such bad thumbnails may be found by manually checking the thumbnail database used by a video search engine. However, such manual checking is very tedious and expensive.

Selecting keyframes from which to generate thumbnails is merely one example of a situation in which it would be useful to have the ability to automatically determine the quality of an image. As another example, consider a surveillance system in which digital photos are taken on a periodic basis. It would be desirable to automatically measure the quality of the photos, and discard those that are not likely to have content that is of interest.

As yet another example of a situation in which it would be useful to automatically determine the quality of an image, consider the situation in which a user takes thousands of digital photos, and wants to select which photos to keep in the user's collection. Under these conditions, it would be useful to automatically identify those photos that are likely to be "bad". Once the bad photos have been automatically identified and removed, the user may then manually inspect the remaining photos to identify those of greatest value.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF SUMMARY OF THE INVENTION

Techniques are described herein for automatically evaluating the quality of digital images based on one or more color characteristics of the images. In some embodiments, a quality metric that indicates the likelihood that the digital images convey semantics is generated based on color characteristics of the digital images.

The automatically generated image quality metric may be used in a variety of contexts. For example, the quality measure may be used to detect bad thumbnails. When the automatically generated quality metric for a thumbnail of an electronic item indicates that the thumbnail is probably bad, one or more alternative thumbnails may be automatically generated for that electronic item. This process may be repeated until a thumbnail that has a sufficiently high quality metric is produced.

DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
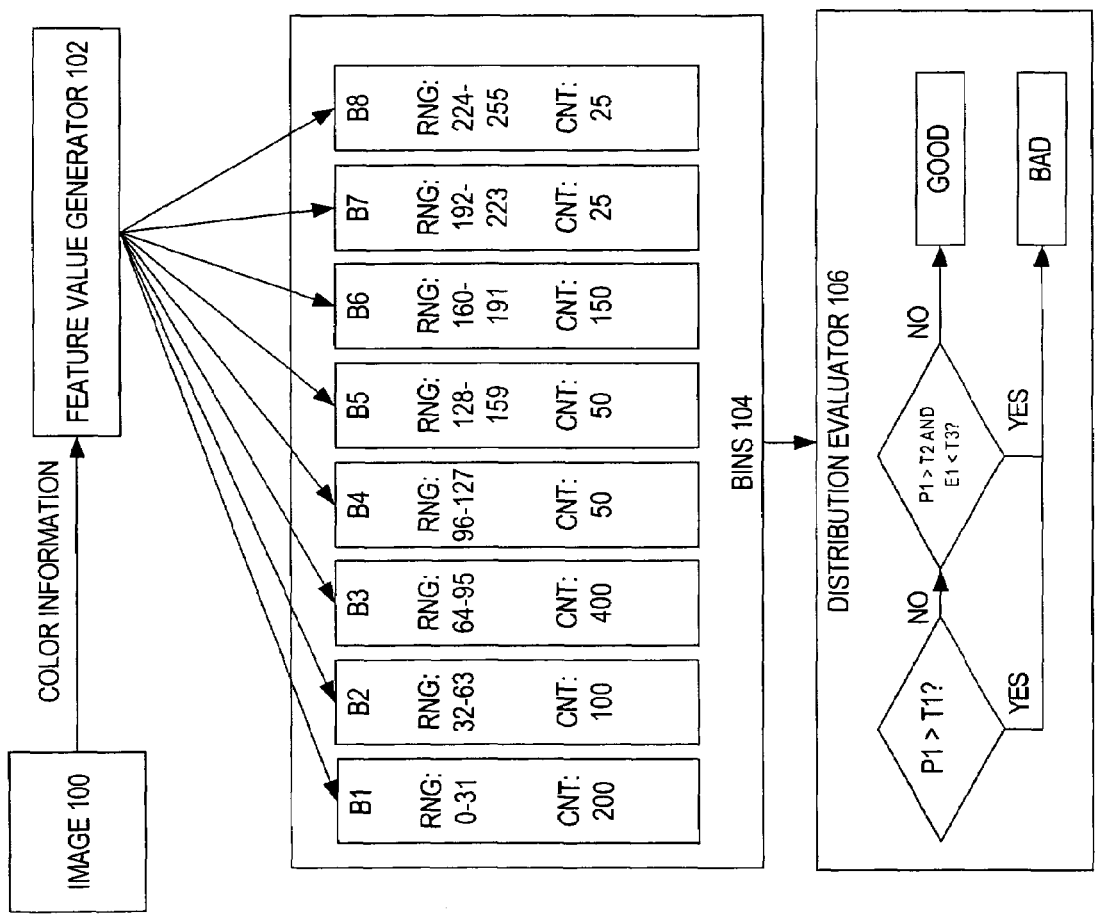
FIG. 1 is a block diagram of a system that evaluates the quality of digital images using an embodiment of the techniques described herein.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

It has been discovered that many uninformative (bad) digital images share certain characteristics. For example, uninformative digital images are often homogonous in colors, and thus cannot convey any semantics. Techniques are described herein for automatically evaluating the quality of digital images based on one or more color characteristics of the images. In some embodiments, a quality metric that indicates the likelihood that the digital images convey semantics is generated based on color characteristics of the digital images.

The automatically generated image quality metric may be used in a variety of contexts. For example, the quality measure may be used to detect bad thumbnails. When the automatically generated quality metric for a thumbnail of an electronic item indicates that the thumbnail is probably bad, one or more alternative thumbnails may be automatically generated for that electronic item. This process may be repeated until a thumbnail that has a sufficiently high quality metric is produced.

In the context of digital images, an alternative thumbnail may be generated using a different thumbnail-generation technique than the technique that was used to generate the bad thumbnail. Alternatively, rather than using a completely different thumbnail-generation technique, the operating parameters used by the same technique may be changed. In the context of video, an alternative thumbnail may be generated by selecting a different keyframe, from the video, from which to generate the alternative thumbnail for the video.

According to one embodiment, a plurality of candidate thumbnails are generated for an electronic item. The content features of each of the candidate thumbnails are analyzed to determine which candidate thumbnail is most likely to convey semantics of the corresponding electronic item. The candidate thumbnail that is automatically determined to be the most likely to convey the semantics of the corresponding electronic item is then used as the thumbnail for the electronic item.

Generating the Quality Metric—Overview

According to one embodiment, a quality metric for a digital image is generated by (1) generating feature values based on one or more color characteristics of the digital image, (2) assigning the feature values to bins, and (3) evaluating the distribution of the feature values among the bins. In generally, the more skewed the distribution of the feature values among the bins, the less likely the digital image conveys semantics. Conversely, the more uniform the distribution of feature values among the bins, the more likely that the digital image conveys semantics. Each phase in the quality metric generation process shall be described in greater detail hereafter.

Phase 1: Generating Feature Values

According to one embodiment, a quality metric is generated based on the distribution, among a plurality of bins, of feature values that are generated based on one or more color characteristics of an image. For the purpose of explanation, an embodiment shall be described in which feature values are generated on a per-pixel basis. However, in alternative embodiments, feature values may be generated on a pixel group basis, where each pixel group may include numerous pixels. For example, in a system that generates feature values on a pixel group basis, a feature value may be generated for each N×N matrix of pixels within the image.

Various color characteristics may be used as the basis for generating feature values for the pixels. According to one embodiment, the luminancy (also known as "brightness") characteristic of each pixel of an image is used as a feature value for performing the quality evaluation of the image. However, in alternative embodiments, other color characteristics may be used. For example, the feature value used to generate the quality metric may alternatively be the hue component of pixels, the green component of pixels, etc., or any combination thereof. For the purpose of explanation, examples shall be given hereafter in which the luminancy component of pixels is used as the basis for generating the quality metrics of images.

Depending on the format of the image data, the luminancy values of the pixels of the image may not be explicitly included in the image data. For example, in some image formats, the image data includes, for each pixel of the image, <r, g, b> values. The <r, g, b> values of a pixel respectively represent the value of the red, green and blue components of the pixel. From these <r, g, b> values, <l, u, v> values may be generated using any of a variety of well-known techniques. An explanation of the transformation of <r, g, b> values to <l, u, v> values is given at en.wikipedia.org/wiki/Lab_color_space. The <l, u, v> values conform to the CIE-LUV color space, where L component defines the luminancy, and U, V define chrominancy of a color.

Having generated the <l, u, v> values of all pixels in an image based on the <r, g, b> values contained in the image data, the luminancy values of the pixels may be used as the feature values that are assigned to bins, as shall be described in greater detail hereafter.

Phase 2: Bin Assignments

Bin assignments are made by associating bins with ranges, and assigning each feature value generated during phase 1 to the bin that corresponds to the range into which the feature value falls. For example, in the system illustrated in FIG. 1, the feature values that are being assigned to bins 104 are luminancy values that are generated by a feature value generator 102 based on the pixels of an image 100. In the illustrated example, the luminancy values have a possible range from 0 to 255.

In the example illustrated in FIG. 1, the feature values generated by feature value generator 102 are assigned to a set of eight bins (B1, B2, B3, B4, B5, B6, B7 and B8). The eight bins (B1, B2, B3, B4, B5, B6, B7 and B8) are associated with the ranges 0-31, 32-63, 64-95, 96-127, 128-159, 160-191, 192-223, and 224-255, respectively, as illustrated in FIG. 1. While eight bins are used for the purposes of illustration, any number of bins may be used. For example, in some embodiments 16 or 32 bins may be used. The techniques described herein are not limited to any particular number of bins.

Once the bins have been assigned to ranges, the feature values generated during phase 1 are assigned to the bins based on the ranges that are associated with the bins. In the illustrated example, 1000 per-pixel luminancy values are generated during phase 1. During phase 2, the 1000 per-pixel luminancy values are assigned to bins (B1, B2, B3, B4, B5, B6, B7 and B8) in the manner illustrated in FIG. 1. In FIG. 1, the count value ("CNT") associated with each of the bins 103 indicates how many of the 1000 feature values are assigned to the bins.

While the example illustrated in FIG. 1 involves 1000 feature values, the actual number of feature values generated during phase 1 will vary based on how many pixels are represented by each pixel value, and the size of the image involved. Assigning feature values to bins that are associated with ranges may be performed, for example, by simply counting how many of the feature values generated during phase 1 fall into each of the established ranges. Once the feature values generated during phase 1 have been assigned to bins, the distribution of the feature values among the bins is evaluated to generate a quality metric for the image. In the embodiment illustrated in FIG. 1, the evaluation is performed by a distribution evaluator 106.

Phase 3: Evaluating the Distribution

A variety of techniques may be used to evaluate the distribution of feature values among the bins, and to generate a quality metric based on the distribution. According to one embodiment, phase 3 is performed in two stages. During the first stage, it is determined whether the percentage P1 of feature values that are assigned to the dominant bin exceeds a predetermined threshold T1. The dominant bin is the bin to which the most feature values were assigned in phase 2. Thus, in the example illustrated in FIG. 1, bin B3 is the dominant bin.

If the percentage P1 of feature values that are assigned to the dominant bin exceeds the predetermined threshold T1, then the image is considered to convey a low amount of semantic content, and may be treated accordingly. For example, depending on the context in which the techniques described herein are used, the image may be flagged as "bad", the image may be discarded, or may be retained but assigned a correspondingly low quality metric.

If the percentage P1 of feature values that are assigned to the dominant bin does not exceed the predetermined threshold value T1, then evaluation proceeds to the second stage. During the second stage, an entropy value E1 is generated based on the distribution of the feature values among the bins. According to one embodiment, all bins other than the dominant bin are considered during the second stage.

The entropy value E1 measures the homogeneity of the spatial-colors in the image. The entropy value E1 may be generated in a variety of ways. According to one embodiment, the entropy value E1 is generated based on the formula $-\Sigma p \log_2 p$, where p is the probability that a feature value will be assigned to a given bin. This formula measures the uniformity of the color distribution in an image. If one image possesses all colors evenly, it has higher entropy. Otherwise if an image's colors are skewed distributed, it has lower entropy. This entropy formula is originated from Shannon's information theory to measure the amount of information that is missing before reception and it is widely used to measure uncertainty in statistics as well.

Using such an entropy formula is merely one way to determine how uniform (or skewed) the distribution of feature values is among the bins. Other skew-measuring techniques may alternatively be used. Thus, the techniques described herein are not limited to the use of entropy values, nor to any particular formula for calculating entropy values.

In the illustrated embodiment, the entropy value is used in conjunction with P1 to determine whether an image is "bad". Specifically, if E1 is less than a threshold T3 (which means the entropy of the spatial-color bin is low, so the distribution of spatial colors is not flat) and P1 is higher than a second threshold T2, then the image is considered to convey a low amount of semantic content, and may be treated accordingly. As mentioned above, treating the image as a "bad" image may involve flagging the image as "bad", discarding the image, or assigning a low quality metric value to the image.

If the image in question is not identified as bad during the first or second stages of the evaluation, then, according to one embodiment, the image is considered "good". Consequently, the image is treated as a good image. What it means to treat the image as a good image may vary from implementation to implementation. For example, treating an image of as a good image may mean using the image as a thumbnail for an electronic item, marking the image as "good", deciding not to discard the image, and/or assigning the image a relatively high quality metric value.

In some embodiments, the quality metric value may simply be binary. That is, the quality metric may simply indicate whether the image is "good" or "bad". In alternative embodiments, the quality metric that is assigned based on the distribution of the feature values produced by an image may comprise a range of possible values. For example, the quality metric values may range from 0 to 1 based on the uniformity of the distribution across the bins, where an image for which all feature values fall into the same bin is assigned a zero, and an image for which all feature values are evenly distributed across all bins is assigned a one.

In embodiments that do not simply make a binary good/bad determination, the quality metric may be generated based, at least in part, on P1 and E1. Having generated non-binary quality metric values for a collection of images, it is possible to present the images in an order that is based on the quality metric values. This may be desirable, for example, in situations where a user desires to manually select photos to delete, but wants to have the manual selection process facilitated by automatically ordering the photos based the likelihood that the photos are "bad".

Applications of the Quality Metric

As mentioned above, quality metric values that are automatically generated using the techniques described herein may be used in a variety of contexts. In particular, the quality metric values may be used in any context in which images that convey little semantic information are treated differently than images that convey a significant amount of semantic information. Both software and hardware implementations are practical.

Since the quality metric values may be generated automatically, use of the quality metric values is particularly useful in contexts in which the quality of large numbers of images needs to be evaluated. For example, use of the techniques described herein is particularly useful in determining which keyframe, within a video, to use to generate a thumbnail to represent the video. In this context, the technique may be implemented at the backend when videos are processed and keyframes are extracted. Alternatively, the technique may be implemented at frontend as a post-filtering process before search results of a video search are returned to users.

For the purposes of selecting a thumbnail, a video file may be treated as a collection of keyframes, where each keyframe is corresponds to an image that may potentially be used as a thumbnail for the video file. In other contexts, the electronic item for which one or more thumbnails are to be generated may be a more loosely-defined collection. For example, a thumbnail for a collection of photos taken by a particular person may be generated by selecting one or more photos, from the collection of photos taken by that particular person, to represent the collection.

According to one embodiment, the techniques described herein may be used as the basis for determining which images, from an arbitrary collection of images, are selected from the collection of images. For example, consider a surveillance system in which digital photographs are taken every ten minutes. The digital photos that are taken by the surveillance system may be considered a collection. The techniques described herein may be employed to automatically select images taken by the surveillance system based on the content features of the images.

Once images have been selected from a collection using the techniques described herein, various additional actions may be taken based on the selection. For example, in the context of the surveillance system mentioned above, it may be desirable to discard all images that are not selected, to free up storage for future images.

These techniques may also be used as a quality control in image/video capturing devices, such as cameras and camcorders, to detect bad quality images and prevent them from storing in the device.

Yet another context in which the techniques described herein would be useful is the image search domain. Specifically, these techniques may be used to find "uninformative"

images that are indexed by an image search engine. If an image is determined to be uninformative by using the techniques described herein, the search engine may determine that the images should not be crawled and/or indexed in the search engine's database.

Spatial Considerations

In the embodiments described above, the quality metric does not take into account the spatial relationships between the pixels used to produce the feature values. However, in an alternative embodiment, such spatial considerations are taken into account during the quality metric generation process. For example, in one embodiment, a color correlogram is generated to describe the spatial distribution of colors in an image. Color correlograms are described, for example, in J. Huang, S. R. Kumar, M. Mitra, W.-J. Zhu, and R. Zabih. "Image indexing using color correlograms" In Proc. IEEE Comp. Soc. Int'l Conf. on Computer Vision and Pattern Recognition, pages 762-768, 1997, San Juan, Puerto Rico, in the section entitled "Spatial Considerations". Color correlograms take into account the spatial relationship of pixels by generating feature values for each pixel based, at least in part, on the color characteristics of neighboring pixels. For example, feature values may be generated in the form $<i, j, k>$, where i is a color characteristic (e.g. luminancy value) of a pixel, j is the color characteristic of a neighboring pixel, and k is the spatial distance between the pixels.

Hardware Overview

Figure 2:
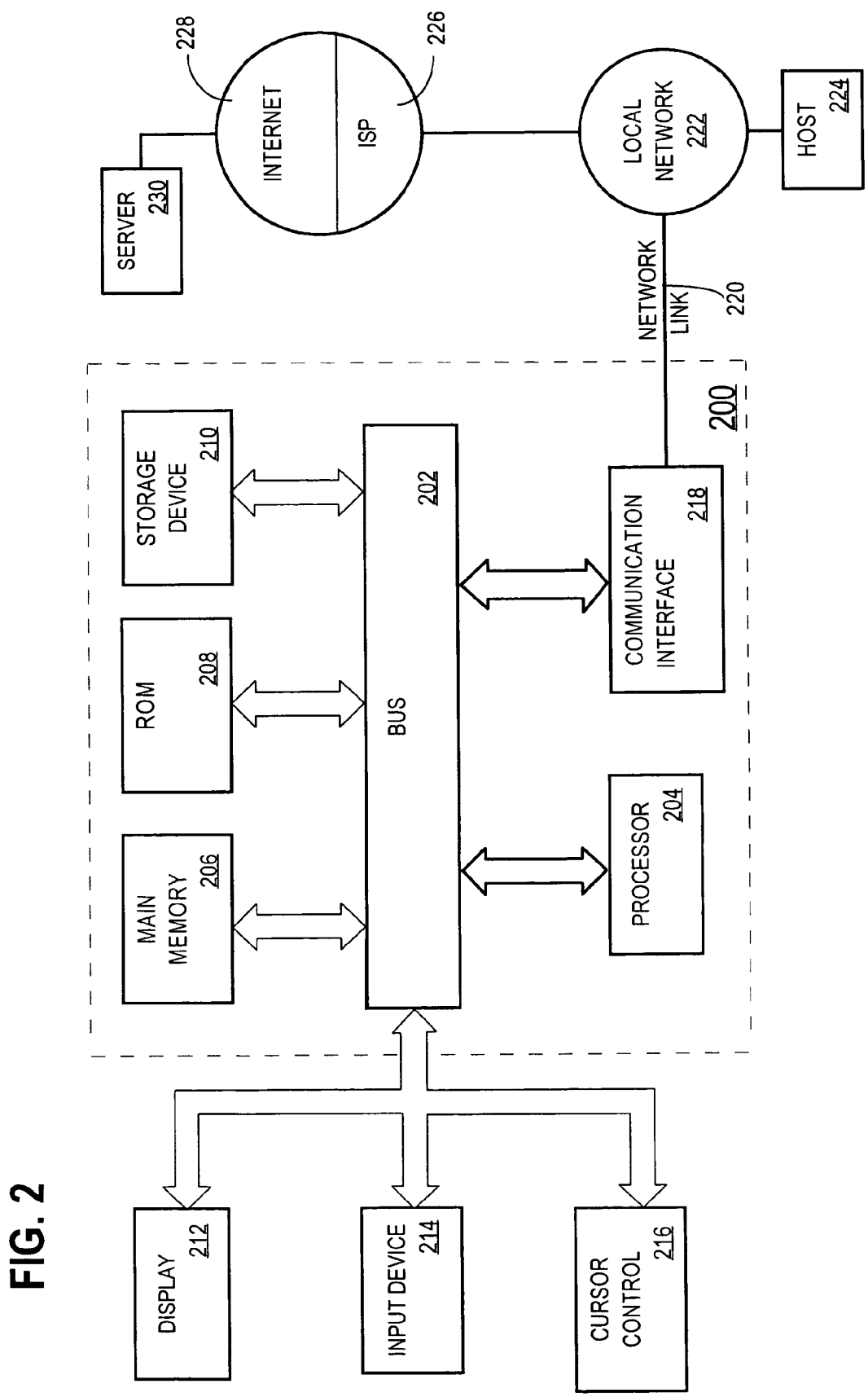
FIG. 2 is a block diagram of a computer system upon which embodiments of the invention may be implemented.

FIG. 2 is a block diagram that illustrates a computer system 200 upon which an embodiment of the invention may be implemented. Computer system 200 includes a bus 202 or other communication mechanism for communicating information, and a processor 204 coupled with bus 202 for processing information. Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

The invention is related to the use of computer system 200 for implementing the techniques described herein. According to one embodiment of the invention, those techniques are performed by computer system 200 in response to processor 204 executing one or more sequences of one or more instructions contained in main memory 206. Such instructions may be read into main memory 206 from another machine-readable medium, such as storage device 210. Execution of the sequences of instructions contained in main memory 206 causes processor 204 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 200, various machine-readable media are involved, for example, in providing instructions to processor 204 for execution. Such a medium may take many forms, including but not limited to, non-volatile media, volatile media, and transmission media. Non-volatile media includes, for example, optical or magnetic disks, such as storage device 210. Volatile media includes dynamic memory, such as main memory 206. Transmission media includes coaxial cables, copper wire and fiber optics, including the wires that comprise bus 202. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 204 for execution. For example, the instructions may initially be carried on a magnetic disk of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are exemplary forms of carrier waves transporting the information.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218.

The received code may be executed by processor 204 as it is received, and/or stored in storage device 210, or other non-volatile storage for later execution. In this manner, computer system 200 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for measuring quality of an electronic image, the method comprising the computer-implemented steps of:
   generating a plurality of feature values based on color attributes of the electronic image; and
   automatically determining a quality metric for the electronic image based, at least in part, on how uniformly the feature values are distributed among a plurality of bins, wherein each bin corresponds to a value range;
   wherein the method is performed by one or more computing devices.

2. The method of claim 1 wherein the plurality of feature values are based, at least in part, on spatial information relating to pixels of said electronic image.

3. The method of claim 1 wherein the step of generating a plurality of feature values includes generating feature values that reflect luminancy of pixels within said electronic image.

4. The method of claim 3 wherein the step of generating a plurality of feature values includes generating, for each pixel of a plurality of pixels in said electronic image, a per-pixel feature value that reflects luminancy of the pixel.

5. The method of claim 1 wherein the step of generating a plurality of feature values includes generating, for each pixel of a plurality of pixels in said electronic image, a per-pixel feature value that reflects one or more color characteristics of the pixel.

6. The method of claim 1 wherein the step of generating a plurality of feature values includes generating, for each pixel group of a plurality of pixel groups in said electronic image, a per-pixel-group feature value that reflects one or more color characteristics of the pixel group.

7. The method of claim 1 wherein the step of automatically determining a quality metric for the electronic image includes:
   identifying, from among said plurality of bins, a dominant bin that is assigned more feature values than any other of said plurality of bins;
   determining whether the percentage of feature values assigned to the dominant bin exceeds a first predetermined threshold; and
   if the percentage of feature values assigned to the dominant bin exceeds the first predetermine threshold, then determining that the electronic image does not contain sufficient semantic information.

8. The method of claim 7 wherein the step of automatically determining a quality metric for the electronic image includes:
   in response to determining that the percentage of feature values assigned to the dominant bin does not exceed the first predetermined threshold, performing the steps of:
      determining whether the percentage of feature values assigned to the dominant bin exceeds a second predetermined threshold;
      determining an entropy value for said electronic image;
      determining whether the entropy value for said electronic image exceeds a third predetermined threshold; and
      if the percentage of feature values assigned to the dominant bin exceeds the second predetermine threshold and the entropy value for the image is below a third predetermined threshold, then determining that the image does not contain sufficient semantic information.

9. The method of claim 8 wherein the step of determining an entropy value includes determining an entropy value based on one or more probabilities of pixels that are associated with all bins, of said plurality of bins, other than said dominant bin.

10. The method of claim 1 further comprising the steps of:
    selecting a keyframe from a video, wherein the electronic image is based on the keyframe; and
    based on the quality metric for the electronic image, determining whether to use said electronic image as a thumbnail for said video.

11. The method of claim 10, further comprising:
    in response to determining that said electronic image should not be used as the thumbnail for said video, performing the steps of:
       selecting another keyframe from said video, wherein the other keyframe corresponds to a second electronic image;
       generating a second plurality of feature values based on color attributes of the second electronic image;
       automatically determining a second quality metric for the second image based, at least in part, on how uniformly the feature values are distributed among the plurality of bins; and
       determining whether the second electronic image should be used as the thumbnail for said video based on the second quality metric.

12. The method of claim 1 further comprising:
    performing the following steps for each image of a plurality of electronic images, wherein the plurality of electronic images includes said electronic image:

generating a plurality of feature values based on color attributes of said each electronic image, automatically determining a quality metric for said each image based, at least in part, on how uniformly the feature values are distributed among a plurality of bins, wherein each bin corresponds to a value range, and automatically determining whether to perform an operation on said each image based on the quality metric determined for said each image.

13. The method of claim 12 wherein:

the plurality of electronic images are captured from a surveillance system; and the step of automatically determining whether to perform an operation on said each image includes automatically determining whether to discard each said image.

14. The method of claim 1 further comprising:

performing the following steps for each image of a plurality of electronic images, wherein the plurality of electronic images includes said electronic image:

generating a plurality of feature values based on color attributes of said each electronic image, and automatically determining a quality metric for said each image based, at least in part, on how uniformly the feature values are distributed among a plurality of bins, wherein each bin corresponds to a value range; and presenting said plurality of images in an order that is based, at least in part, on the quality metric determined for said each image.

15. One or more non-transitory machine readable storage storing instructions which, when executed by one or more processors, causes performance of the method recited in claim 1.

16. One or more non-transitory machine readable storage storing instructions which, when executed by one or more processors, causes performance of the method recited in claim 2.

17. One or more non-transitory machine readable storage storing instructions which, when executed by one or more processors, causes performance of the method recited in claim 3.

18. One or more non-transitory machine readable storage storing instructions which, when executed by one or more processors, causes performance of the method recited in claim 4.

19. One or more non-transitory machine readable storage storing instructions which, when executed by one or more processors, causes performance of the method recited in claim 5.

20. One or more non-transitory machine readable storage storing instructions which, when executed by one or more processors, causes performance of the method recited in claim 6.

21. One or more non-transitory machine readable storage storing instructions which, when executed by one or more processors, causes performance of the method recited in claim 7.

22. One or more non-transitory machine readable storage storing instructions which, when executed by one or more processors, causes performance of the method recited in claim 8.

23. One or more non-transitory machine readable storage storing instructions which, when executed by one or more processors, causes performance of the method recited in claim 9.

24. One or more non-transitory machine readable storage storing instructions which, when executed by one or more processors, causes performance of the method recited in claim 10.

25. One or more non-transitory machine readable storage storing instructions which, when executed by one or more processors, causes performance of the method recited in claim 11.

26. One or more non-transitory machine readable storage storing instructions which, when executed by one or more processors, causes performance of the method recited in claim 12.

27. One or more non-transitory machine readable storage storing instructions which, when executed by one or more processors, causes performance of the method recited in claim 13.

28. One or more non-transitory machine readable storage storing instructions which, when executed by one or more processors, causes performance of the method recited in claim 14.

* * * * *